Patented Feb. 2, 1943

2,310,046

UNITED STATES PATENT OFFICE 2,310,046

METHOD OF REFINING SULPHATE TURPENTINE AND TALL OIL

Floyd Trimble, Chicago, Ill., assignor to The Quaker Oats Company, Chicago, Ill., a corporation of New Jersey No Drawing. Application August 3, 1940, Serial No. 351,233

19 Claims. (Cl. 260—97.5)

The present invention relates to a method of refining turpentine and more particularly to an integrated process for simultaneously refining crude sulphate turpentine and crude tall oil.

As is well known, in the manufacture of kraft or sulphate paper, two water insoluble liquid by-products are obtained which are known in the art as sulphate turpentine and sulphate tall oil or merely as tall oil, which latter term I shall use to describe it hereinafter. These by-products are produced in large quantities, but because of their highly objectionable odor and dark color, their commercial utility has heretofore been considerably restricted. Many efforts have been made to provide a satisfactory process for refining these by-products, but prior methods have not been satisfactory either from the point of view of effectiveness or of cost. Moreover, it has heretofore been customary to refine these two by-products separately, due, no doubt, to their chemical dissimilarity, by processes which, although generally diverse in nature, possess the common characteristic of being laborious, time-consuming, and inefficient.

An object of the present invention is to provide a new and improved process for removing color and odor from crude sulphate turpentine, which method obviates the disadvantages of prior art refining procedures.

A further object is to provide a simple, rationally integrated process for simultaneously removing from crude sulphate turpentine and crude tall oil the undesirable color and odor.

Another object is the provision of an improved process of the character described which takes advantage of the selective solvent action of certain readily available industrial chemicals, when employed in the manner hereinafter more particularly described.

A still further object is to provide a process for producing superior grades of refined tall oil and refined sulphate turpentine in higher yields and at lower costs when compared with the processes of the prior art.

Other objects will be apparent as this invention is hereinafter more fully described.

In accordance with one aspect of the present invention, crude sulphate turpentine is refined by a solvent extraction process employing as a selective solvent a furan derivative substantially immiscible in the crude sulphate turpentine but capable of selectively dissolving color and odor producing bodies thereof. The process of the present invention includes intimately contacting the crude sulphate turpentine with the furan derivative, permitting the mixture to separate into an upper layer composed substantially of refined turpentine with a small proportion of dissolved furan derivative, and a lower layer composed substantially of said furan derivative with color and odor producing bodies. The upper layer is withdrawn and, if desired, the small amount of furan derivative dissolved therein may be removed from the solution by suitable means, for example, by washing the same with water or aqueous alkali metal bisulphite, or by distillation or the like. The refined product thus obtained is characterized by a mild odor which renders it satisfactory for commercial uses. The furan derivative may be recovered from the solution containing the dissolved color and odor producing bodies and the recovered furan derivative employed in the refining of further quantities of turpentine.

The furan derivatives contemplated in accordance with the present invention are readily available commercially and include, for example, the inexpensive solvent furfural or one of its reduction products such as furfuryl alcohol or tetrahydrofurfuryl alcohol. When tetrahydrofurfuryl alcohol is used as the selective solvent, about 5 per cent water should be added to the alcohol to render the same insoluble in the turpentine. In general, either anhydrous furfural or furfural containing a small percentage of water may be used as a selective solvent. I prefer, however, to employ furfural which is saturated with water, inasmuch as the use of water-saturated furfural definitely tends to increase the yield of the refined turpentine. A further advantage in the use of wet furfural resides in the fact that one can use the furfural layer from the decanter directly, making it unnecessary to employ a second column to dry the furfural, which will reduce the cost of operation.

In order to disclose the nature of the present invention still more clearly, an illustrative example will hereinafter be described. It should be clearly understood, however, that this is done purely for purposes of illustration and is not to be considered a limitation upon the spirit or scope of my invention.

Example No. 1

About five parts of crude sulphate turpentine is stirred with about five parts of furfural (either anhydrous or wet), preferably added in several increments at a temperature of about 25° C., for about fifteen minutes. The batch is permitted to stand until two layers separate. The lower layer consisting of furfural, dissolved odor and color producing bodies, together with a small proportion of turpentine, is drawn off and distilled to recover the furfural for reuse. The upper layer consisting of turpentine and a small amount of dissolved furfural is washed with water or with alkali metal bisulphite solution, or subjected to distillation, in order to remove the furfural from the turpentine. The result of the foregoing treatment is a mild-odored turpentine ready for commercial use.

In cases where distillation is not used, the last traces of furfural in the turpentine layer may be efficiently removed by washing the turpentine layer counter-currently with a stream of water. If desired, the mutual solubilities of the furfural and the turpentine may be decreased by adding to the turpentine, prior to the addition of the furfural, an aliphatic hydrocarbon of the gasoline boiling range. This gasoline may be removed from the refined turpentine by distillation subsequent to removal of furfural by washing.

In addition to the above described process of refining sulfate turpentine alone by means of a selective solvent, the present invention also contemplates an integrated method for simultaneously refining crude sulphate turpentine and tall oil. In accordance with this aspect of the present invention, I have found that the yield of refined tall oil may be increased, and the properties of the refined tall oil improved, if a mixture of turpentine and tall oil is subjected to solvent extraction with the furan derivative hereinbefore disclosed. The addition of the turpentine to the tall oil apparently decreases the mutual solubilities of the furan derivative and the tall oil and this may perhaps account for the improvement in the yield and characteristics of the refined tall oil.

In accordance with this aspect of the present invention, the crude sulphate turpentine and tall oil mixture is intimately contacted with the furan derivative immiscible with the mixture of said oils but capable of selectively dissolving color and odor producing bodies thereof. After the mixture has been permitted to separate into an upper layer composed substantially of turpentine, tall oil, and a small amount of furan derivative, and a lower layer composed substantially of the furan derivative with dissolved color and odor producing bodies, the upper layer is withdrawn and the dissolved furan derivative is separated from the tall oil and turpentine by suitable means, for example, by washing with water or with an aqueous alkali metal bisulphite solution. After the removal of the furan derivative, th turpentine is recovered from the tall oil by steam distillation, preferably at reduced pressure to avoid the effects of high temperature, and there remains in the distillation vessel a mild-odored, light-colored tall oil ready for commercial use. I have found further that any turpentine odor remaining in the tall oil obtained, as described above, can be effectively removed by aeration of the tall oil.

In order to more fully illustrate this aspect of the present invention, a preferred embodiment thereof will now be described. It should be understood, however, that this is likewise done solely for the purpose of illustration and is not to be construed as a limitation upon the spirit and scope thereof.

*Example No. 2*

A solution of one part crude tall oil in five parts crude sulphate turpentine is stirred with about five parts furfural (anhydrous or wet), preferably added incrementally, at a temperature of about 25° C. for about fifteen minutes. The mixture is permitted to stand until two layers separate. The lower layer which consists of furfural, dissolved odor and color producing bodies and a small amount of turpentine and tall oil, is drawn and the furfural distilled for reuse. The upper layer consists of turpentine, tall oil and a small amount of furfural. The furfural is removed from the tall oil-turpentine solution by suitable means, for example, by washing with water or with an aqueous alkali metal bisulphite solution. After the removal of the furfural, the turpentine is removed from the tall oil by steam distillation, preferably at reduced pressure to avoid the effects of high temperature, and there remains in the distillation vessel a mild-odored, light-colored tall oil ready for commercial use. The last traces of turpentine odor can be effectively removed from the tall oil by aeration of the same.

As hereinbefore mentioned, it is preferable to employ furfural containing at least a small percentage of water as a selective solvent inasmuch as it renders it unnecessary to dry the furfural for reuse and also tends to increase the yield of the refined products.

In the foregoing description it will be apparent that many variations in detail may be made without departing from the spirit and scope of the invention. Thus, it is apparent that no particular form of apparatus is necessary for carrying out the process. Moreover, it is unnecessary to employ any particular temperature in the treatment or to limit the use of the solvent, tall oil, or turpentine to any narrow range of proportions. The solvent extraction step may be carried out either as a single or multiple batch system, or a counter-current method of contact may be employed as preferred. Many other variations in detail will be apparent to those skilled in the art. I therefore intend to be limited only in accordance with the following patent claims.

I claim:

1. A method of refining crude sulphate turpentine which includes intimately contacting said crude turpentine with a liquid furan derivative substantially immiscible therewith but capable of selectively dissolving color and odor producing bodies thereof, said furan derivative being selected from the group consisting of furfural and a reduction product of furfural, allowing the mixture to separate into an upper layer composed substantially of refined turpentine and a lower layer composed substantially of said furan derivative with dissolved color and odor producing bodies, and separating said turpentine layer from said furan layer.

2. A method of refining crude sulphate turpentine which includes intimately contacting said crude turpentine with a liquid furan derivative substantially immiscible therewith but capable of selectively dissolving color and odor producing bodies thereof, said furan derivative being selected from the group consisting of furfural and a reduction product of furfural, allowing the mixture to separate into an upper layer composed substantially of refined turpentine with a small proportion of dissolved furan derivative and a lower layer composed substantially of said furan derivative with dissolved color and odor producing bodies, separating said upper and lower layers and removing the small proportion of dissolved furan derivative from said turpentine layer.

3. A method of refining crude sulphate turpentine which includes intimately contacting said crude turpentine with furfural, allowing the resulting mixture to separate into an upper layer composed substantially of refined turpentine and a lower layer composed substantially of said furfural with dissolved color and odor producing bodies, and separating said turpentine layer from said furfural layer.

4. A method of refining crude sulphate turpentine which includes intimately contacting said crude turpentine with wet furfural, allowing the mixture to separate into an upper layer composed substantially of refined turpentine and a lower layer composed substantially of said furfural with dissolved color and odor producing bodies, and separating said turpentine layer from said furfural layer.

5. A method of refining crude sulphate turpentine which includes intimately contacting said crude turpentine with wet furfural, allowing the resulting mixture to separate into an upper layer composed substantially of refined turpentine with a small proportion of dissolved furfural and a lower layer composed substantially of said furfural with dissolved color and odor producing bodies, separating said upper and lower layers, and removing the small proportion of dissolved furfural from said turpentine layer.

6. The process of claim 5 wherein said furfural is removed from said turpentine layer by washing said layer with water.

7. The method of claim 5 wherein said furfural is removed from said turpentine layer by washing said layer with an aqueous solution of alkali metal bisulphite.

8. An integrated method for simultaneously refining sulphate turpentine and tall oil, which includes intimately mixing crude sulphate turpentine and crude tall oil with a liquid furan derivative substantially immiscible with the mixture of said oils but capable of selectively dissolving the color and odor producing bodies thereof, said furan derivative being selected from the group consisting of furfural and a reduction product of furfural, permitting the mixture to separate into an upper layer composed substantially of turpentine, tall oil and a small proportion of dissolved furan derivative and a lower layer composed of furan derivative with dissolved color and odor producing bodies, separating said upper layer and removing therefrom the dissolved furan derivative and turpentine whereby to obtain a mild-odored, light-colored refined tall oil.

9. An integrated method of refining sulphate turpentine and tall oil simultaneously which includes intimately mixing crude sulphate turpentine and crude tall oil with a liquid furan derivative substantially immiscible with the mixture of said oils but capable of selectively dissolving said color and odor producing bodies thereof, said furan derivative being selected from the group consisting of furfural and a reduction product of furfural, allowing the mixture to separate into an upper layer composed substantially of turpentine, tall oil and a small amount of dissolved furan derivative, and a lower layer composed substantially of said furan derivative with dissolved color and odor producing bodies, separating said upper and lower layers, removing from the separated upper layer the dissolved furan derivative and turpentine of said layer whereby to obtain a mild-odored, light-colored refined tall oil and subsequently separating the turpentine from the furan derivative to obtain a mild-odored turpentine suitable for commercial use.

10. An integrated method for simultaneously refining sulphate turpentine and tall oil, which includes intimately contacting crude sulphate turpentine and crude tall oil with furfural, permitting the mixture to separate into an upper layer composed substantially of turpentine, tall oil and a small proportion of dissolved furfural and a lower layer composed substantially of furfural with dissolved color and odor producing bodies, separating said upper layer and removing therefrom the dissolved furfural and turpentine whereby to obtain a mild-odored, light-colored refined tall oil.

11. An integrated method of refining sulphate turpentine and tall oil simultaneously which includes intimately contacting crude sulphate turpentine and crude tall oil with furfural, allowing the mixture to separate into an upper layer composed substantially of turpentine, tall oil and a small amount of dissolved furfural, and a lower layer composed substantially of said furfural with dissolved color and odor producing bodies, separating said upper and lower layers, removing from the separated upper layer the dissolved furfural and turpentine of said layer whereby to obtain a mild-odored, light-colored refined tall oil and subsequently separating the turpentine from the furfural to obtain a mild-odored turpentine suitable for commercial use.

12. An integrated method for simultaneously refining sulphate turpentine and tall oil, which includes intimately contacting crude sulphate turpentine and crude tall oil with wet furfural, permitting the mixture to separate into an upper layer composed substantially of turpentine, tall oil and a small proportion of dissolved furfural and a lower layer composed substantially of furfural with dissolved color and odor producing bodies, separating said upper layer and removing therefrom the dissolved furfural and turpentine whereby to obtain a mild-odored, light-colored refined tall oil.

13. An integrated method of refining sulphate turpentine and tall oil simultaneously which includes intimately contacting crude sulphate turpentine and crude tall oil with wet furfural substantially immiscible with the mixture of said oils but capable of selectively dissolving said color and odor producing bodies thereof, allowing the mixture to separate into an upper layer composed substantially of turpentine, tall oil and a small amount of dissolved furfural, and a lower layer composed substantially of said furfural with dissolved color and odor producing bodies, separating said upper and lower layers, removing from the separated upper layer the dissolved furfural and turpentine of said layer whereby to obtain a mild-odored, light-colored refined tall oil and subsequently separating the turpentine from the furfural to obtain a mild-odored turpentine suitable for commercial use.

14. The process of claim 13 wherein said furfural is removed from said turpentine layer by washing said layer with water.

15. The process of claim 13 wherein said furfural is removed from said turpentine layer by washing said layer with an aqueous solution of alkali metal bisulphite.

16. A method of refining crude sulphate turpentine which comprises contacting said crude turpentine with a liquid furan derivative substantially immiscible therewith but capable of selectively dissolving color- and odor-producing bodies thereof, said furan derivative being selected from the group consisting of furfural and a reduction product of furfural, whereby said bodies are extracted from said crude turpentine, and thereafter separating said furan derivative and extracted bodies from the resulting refined turpentine.

17. The method recited in claim 16 wherein said furan derivative is furfural.

18. The method recited in claim 16 wherein said furan derivative is furfuryl alcohol.

19. The method recited in claim 16 wherein said furan derivative is tetrahydrofurfuryl alcohol.

FLOYD TRIMBLE.